United States Patent [19]

Purcell

[11] Patent Number: 5,462,345

[45] Date of Patent: Oct. 31, 1995

[54] RESILIENT WHEELS WITH REINFORCING RINGS

[75] Inventor: Robert J. Purcell, Washington, Ill.

[73] Assignee: Caterpillar Inc., Peoria, Ill.

[21] Appl. No.: 236,277

[22] Filed: Apr. 29, 1994

[51] Int. Cl.⁶ .................................................. B62D 55/14
[52] U.S. Cl. .................................................. 305/56; 305/25
[58] Field of Search .................................. 305/12, 13, 21, 305/25, 28, 56, 57

[56] References Cited

U.S. PATENT DOCUMENTS

| 969,722 | 9/1910 | Pitman . | |
|---|---|---|---|
| 2,059,213 | 11/1936 | Dorst | 305/21 |
| 2,898,965 | 8/1959 | Eddy | 305/56 X |
| 2,984,524 | 5/1961 | Franzen | 305/56 |
| 3,367,726 | 2/1963 | Tucker | 305/28 X |
| 3,606,497 | 9/1971 | Gilles | 305/56 |
| 4,607,892 | 8/1986 | Payne et al. | 305/56 |
| 5,141,299 | 8/1992 | Korpi | 305/56 |

FOREIGN PATENT DOCUMENTS 206572  11/1939  Switzerland ............... 305/56

*Primary Examiner*—Russell D. Stormer
*Attorney, Agent, or Firm*—Claude F. White

[57] ABSTRACT

A belted undercarriage assembly for a belt laying track machine includes a frame, an endless belt for supporting the machine, a plurality of spaced apart resilient wheels in contact with the belt, and a plurality of guide members associated with the belt. Each of the resilient wheels includes a side wall portion having a reinforcing ring attached thereto. The reinforcing rings are adapted to contact the guide members and prolong the useful life of the resilient wheels. The reinforcing rings are preferably segmented to provide a plurality of spaced apart pads having substantially straight edge portions for removing debris from the frame as the resilient wheels rotate.

11 Claims, 3 Drawing Sheets

RESILIENT WHEELS WITH REINFORCING RINGS

TECHNICAL FIELD

This invention relates generally to resilient idler wheels and more particularly to resilient idler wheels for an endless belt of a belted undercarriage assembly. The resilient idler wheels include reinforcing rings which are adapted to contact guide portions of the endless belt to prolong the wear life of the resilient idler wheels.

BACKGROUND ART

Agricultural and construction machines are often required to operate in soils which are extremely wet and muddy and in very sandy soils. Conventional wheel type machines generally do not operate efficiently in such soil conditions. Therefore, alternate types of machines which can operate in such adverse soil conditions are in demand. One type of such machine is one having an undercarriage incorporating an endless flexible drive belt and associated support rollers and idler wheels. This type of belted undercarriage is now widely used on both powered and non-powered machines. On the non-powered machines, such as pulled work trailers, rubber tires or rubber coated wheels are generally used for the idler wheel assemblies. Each assembly includes a pair of spaced apart tires or rubber coated wheels which form an opening therebetween. The flexible belt includes a plurality of integrally formed resilient guide blocks which pass through the opening to guide the flexible belt. Continuous frictional contact between the guide blocks and the idler wheels can cause damage to the idler wheels and the guide blocks. To prevent such frictional contact and damage, it is important that proper alignment between the guide blocks and the idler wheels be maintained. However, even when good alignment is maintained, some contact will occur between the guide blocks and the idler wheels.

The present invention is directed to overcoming one or more of the problems as set forth above.

DISCLOSURE OF THE INVENTION

In one aspect of the present invention, apparatus for supporting and guiding an elastomeric drive belt of a belted undercarriage assembly includes a resilient wheel having first and second spaced apart side wall portions with the resilient wheel being adapted to contact the drive belt. The resilient wheel is further adapted to be mounted to the undercarriage assembly adjacent the guiding portion and includes a reinforcing ring connected to one of the side wall portions.

Idler assemblies for endless belted undercarriage structures often use spaced apart rubber tires or rubber coated wheels as the idler wheels. Most endless drive belts have some type of guide blocks formed on the belt to guide the belt as it moves around the idler wheels. These guide blocks pass through the opening between the idler wheels to guide the flexible belt. If the belt is not closely aligned, the guide blocks will contact the side walls of the idler wheels. This continuous frictional contact can damage the idler wheels and the guide blocks.

Additionally, because the belted undercarriage assemblies operate in wet and muddy soil conditions, mud and debris accumulate on the undercarriage assembly. Such accommodation can reduce the operational efficiency of the undercarriage assembly and accelerate the wear of various undercarriage components.

The subject invention provides structure which prolongs the useful life of the resilient idler wheels and other undercarriage components. This is accomplished by providing reinforcing rings on the resilient idler wheels.

BEST MODE FOR CARRYING OUT THE INVENTION

Figure 1:
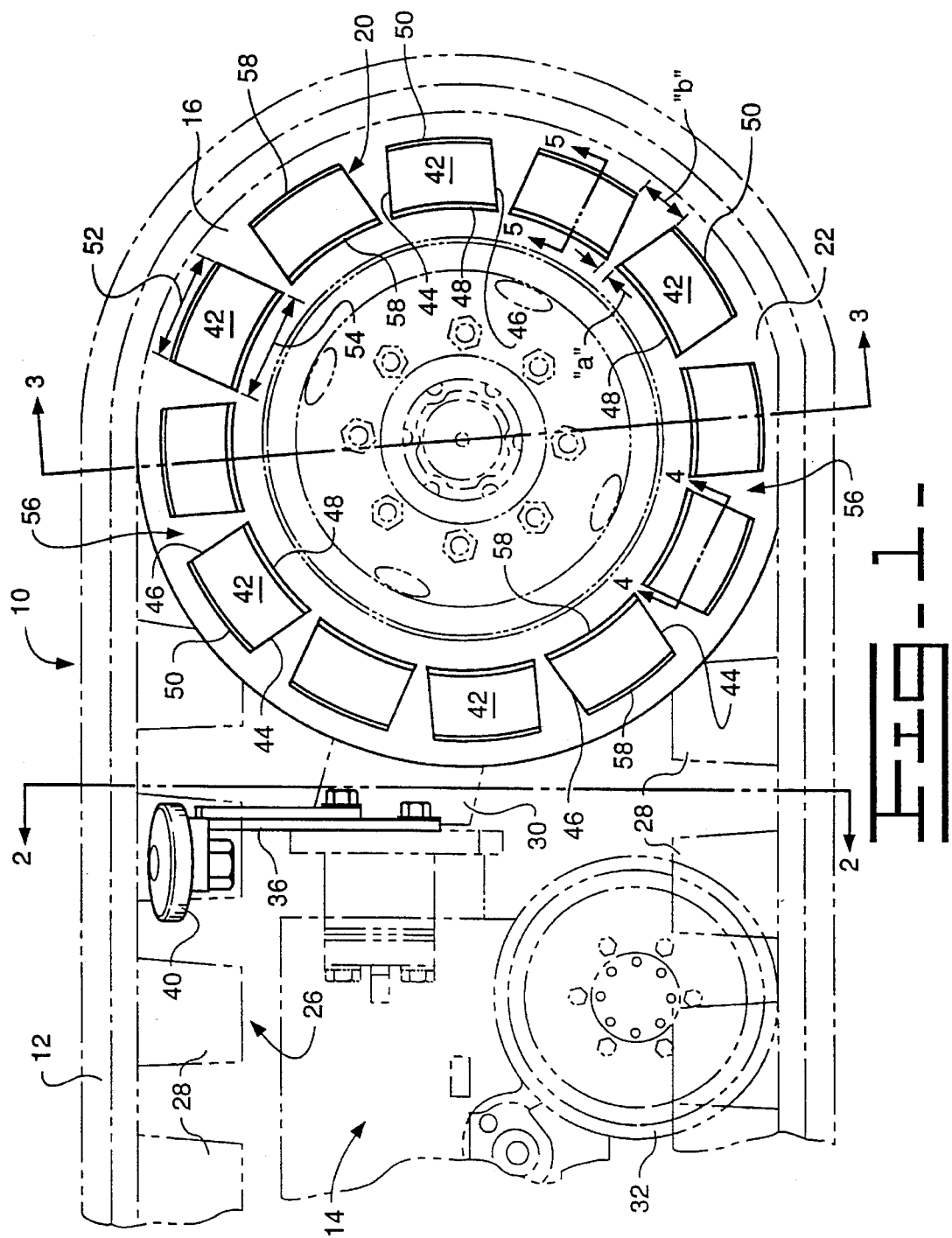
FIG. 1 is a diagrammatic side elevational view of a portion of a belted undercarriage assembly incorporating the subject invention.
Figure 2:
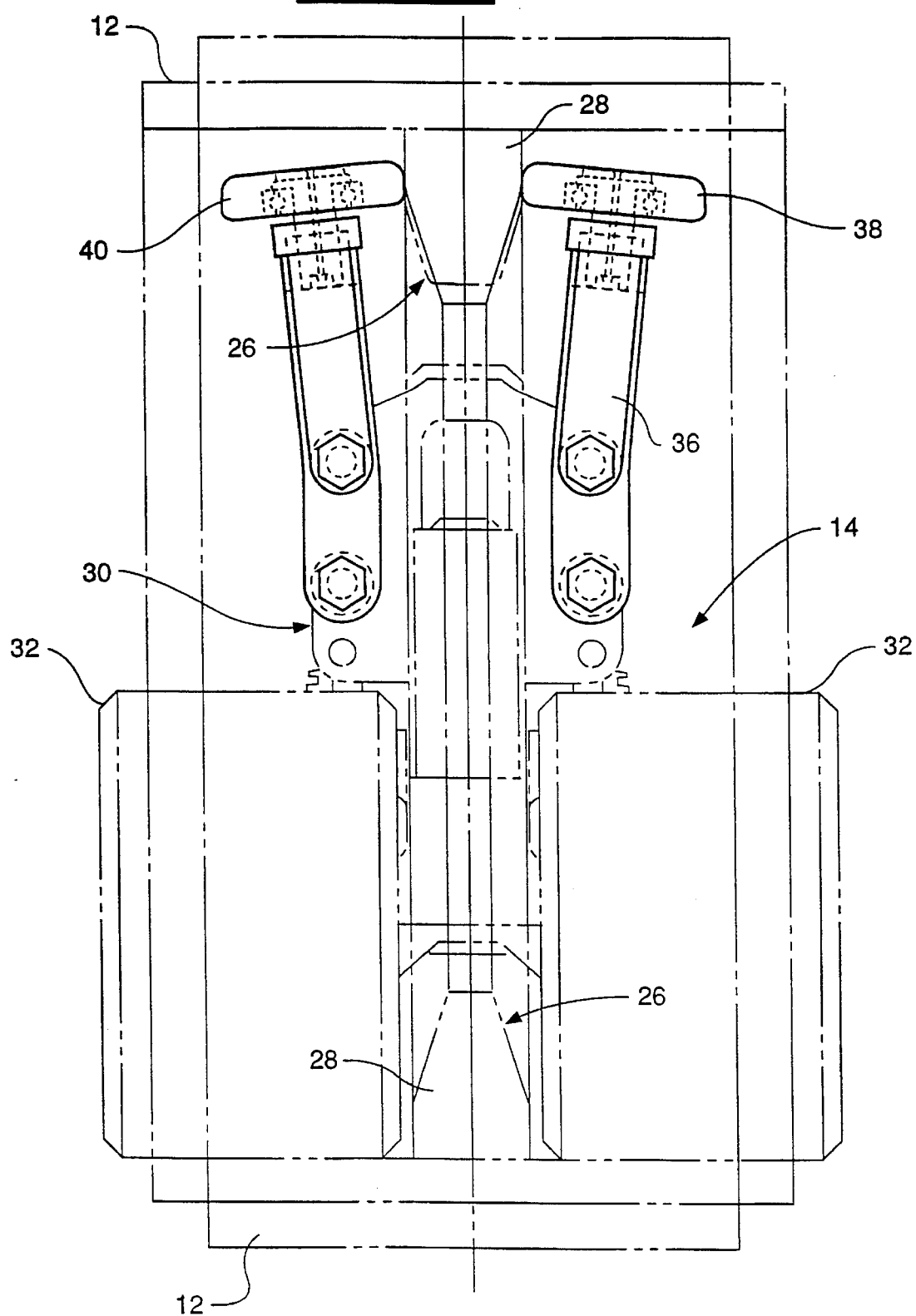
FIG. 2 is a diagrammatic front elevational view, on an enlarged scale, taken generally along the lines 2—2 of FIG. 1.
Figure 3:
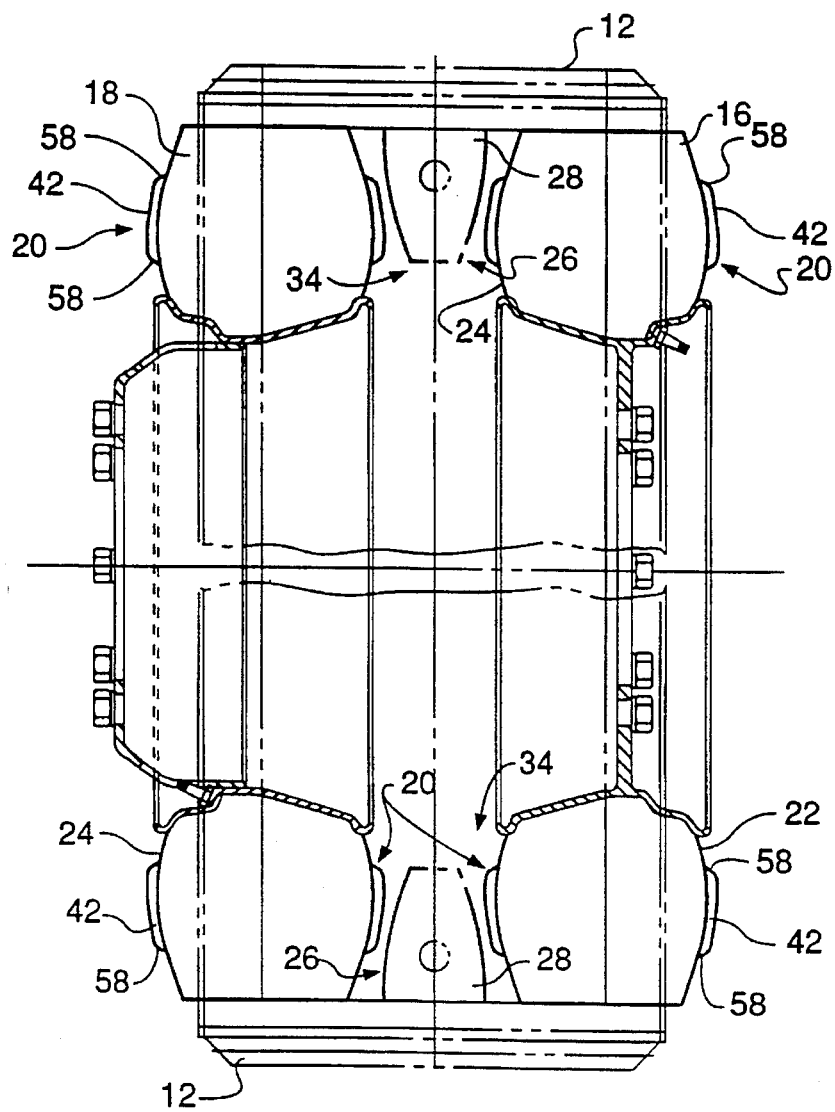
FIG. 3 is a diagrammatic sectional view taken generally along the lines 3—3 of FIG. 1.
Figure 4:
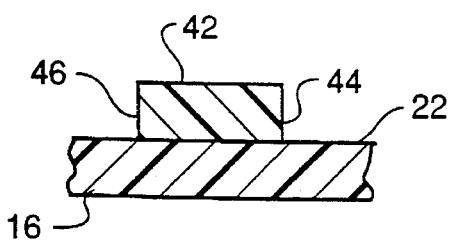
FIG. 4 is a diagrammatic sectional view, on an enlarged scale, taken generally along the lines 4—4 of FIG. 1.
Figure 5:
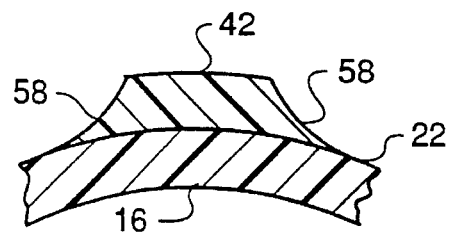
FIG. 5 is a diagrammatic sectional view, on an enlarged scale, taken generally along the lines 5—5 of FIG. 1.

Referring to the drawings, an apparatus 10 for supporting and guiding an endless elastomeric drive belt 12 of a belted undercarriage assembly 14 includes first and second resilient idler wheels 16,18 and resilient reinforcing rings 20 which are connected to the resilient wheels 16,18. Each of the wheels 16,18 has first and second side wall portions 22,24 and a resilient reinforcing ring 20 is preferably connected to each side wall portion 22,24. The drive belt 12 has a guiding portion 26 which includes a plurality of spaced guide blocks 28. The idler wheels 16,18 are mounted to the undercarriage assembly 14 and are adapted to contact the drive belt 12 adjacent the guide blocks 28. The undercarriage assembly 14 includes a frame structure 30 which supports the idler wheels 16,18 and a plurality of guide wheels 32. The idler wheels 16,18 are spaced apart to define an opening 34 therebetween to accommodate the guide blocks 28.

The undercarriage assembly 14 further includes a bracket 36 connected to the frame structure 30 and first and second spaced apart guide rollers 38,40 rotatably connected to the bracket 36. The guide rollers 38,40 are positioned adjacent the guide blocks 28 and the resilient wheels 16,18, and are adapted to contact the guide blocks 28 and guide them into the opening 34.

Each of the reinforcing rings 20 is preferably segmented and includes a plurality of substantially similar spaced pads 42. The pads 42 are bonded to the side wall portions 22,24 of each wheel 16,18 and each pad 42 includes first and second edge portions 44,46. Each edge portion 44,46 is straight and substantially normal to the side wall portion 22,24 to which the pad 42 is bonded. Each pad 42 also includes inner and outer edge portions 48,50 having respective first and second arc length 52,54. Preferably, the first and second arc lengths 52,54 are substantially equal, whereby adjacent pads 42 define a wedge shaped space 56 therebetween. The space 56 has an inner dimension "a" and an outer dimension "b", with "a" being less than "b". The inner and outer edge portions 48,50 are connected to the side wall portions 22,24 by a radius 58.

The first and second straight edge portions 44,46 serve to remove mud and debris from the undercarriage assembly 14, especially the frame structure 30, as the idler wheels rotate. This mud and debris is ejected outwardly of the pads 42 because of the larger outer dimension "b" of the space 56.

INDUSTRIAL APPLICABILITY

With reference to the drawings and the previous detailed description, the subject resilient wheels 16,18 with reinforcing rings 20 are particularly useful for increasing the wear life of certain components of a belted undercarriage assembly 14. Specifically, as the resilient idler wheels 16,18 rotate, and the drive belt 12 moves around the wheels 16,18, the guide blocks 28 move into the opening 34 between the wheels 16,18. If the belt is slightly misaligned, the guide blocks 28 frictionally contact the side wall portions 22 or 24. Such frictional contact, over time, can cause damage to the resilient wheels 16,18 and the guide blocks 28. The reinforcing rings 20 add material to the side wall portions 22,24 and strengthen the resilient wheels 16,18. Additionally, as the wheels rotate, the first and second straight edge portions 44,46 of the pads 42 wipe mud and debris from the adjacent undercarriage components. The guide rollers 38,40 guide the guide blocks 28 into the opening 34 between the resilient wheels 16,18, as the belt 12 moves around the wheels 16,18. This prevents continuous frictional contact between the guide blocks 28 and the side wall portions 22,24 of the wheels 16,18. The wheels 16,18 are reversible so both side wall portions 22,24, with reinforcing ring 20, are utilized to further prolong the useful life of the idler wheels 16,18.

Other aspects, objects, and advantages of this invention can be obtained from a study of the drawings, the disclosure, and the appended claims.

I claim:

1. Apparatus for supporting and guiding an endless elastomeric drive belt of a belted undercarriage assembly said drive belt having a guiding portion, comprising:

a resilient wheel having first and second spaced apart side wall portions, said wheel being adapted to contact said drive belt, and also being adapted to be mounted to said undercarriage assembly adjacent said guiding portion; and a plurality of substantially similar spaced resilient pads connected to one of said side wall portions of said resilient wheel, each pad being bonded to a side wall portion of the resilient wheel.

2. An apparatus, as set forth in claim 1, wherein each of said pads has a first edge portion which is substantially normal to the side wall portion to which the pad is bonded.

3. An apparatus, as set forth in claim 1, wherein each of said pads has first and second edge portions, each edge portion being substantially normal to the side wall portion to which the pad is bonded.

4. An apparatus, as set forth in claim 1, wherein each of said pads has an inner edge portion having a first arc length and an outer edge portion having a second arc length, said first and second arc lengths being substantially equal.

5. An apparatus, as set forth in claim 4, wherein said inner and outer edge portions are connected to the wheel side wall portion by a radius.

6. An apparatus, as set forth in claim 1, wherein adjacent pads define a wedge-shaped space therebetween, said space having an inner dimension "a" and an outer dimension "b", with "b" being greater than "a".

7. An apparatus, as set forth in claim 1, including a wheel supporting frame structure, first and second spaced apart rotatable guide rollers positioned adjacent said guiding portion and said resilient wheel, and a bracket connected to said frame structure, said guide rollers being rotatably connected to said bracket and adapted to contact said belt guiding portion.

8. A belted undercarriage assembly having a frame structure, an idler assembly having first and second spaced resilient idler wheels which define an opening therebetween, and an endless flexible drive belt having a plurality of guide blocks, the improvement comprising:

each of said resilient idler wheels having first and second side wall portions and a plurality of substantially similar resilient pads bonded to each side wall portion to form a reinforcing ring around each side wall portion; and each of said resilient pads having first and second edge portions, each edge portion being substantially normal to the side wall portion to which said pad is bonded.

9. An undercarriage assembly, as set forth in claim 8, wherein adjacent pads define a wedge-shaped space therebetween, said space having an inner dimension "a" and an outer dimension "b", with "a" being less than "b".

10. An undercarriage assembly, as set forth in claim 8, wherein each of said pads has an inner edge portion having a first arc length and an outer edge portion having a second arc length, said first and second arc lengths being substantially equal.

11. An undercarriage assembly, as set forth in claim 8, including first and second spaced apart rotatable guide rollers positioned adjacent said opening and said guide blocks and said idler wheels, and a bracket connected to said frame structure, said guide rollers being rotatably connected to said bracket and adapted to contact said guide blocks.

* * * * *